Figure 1:
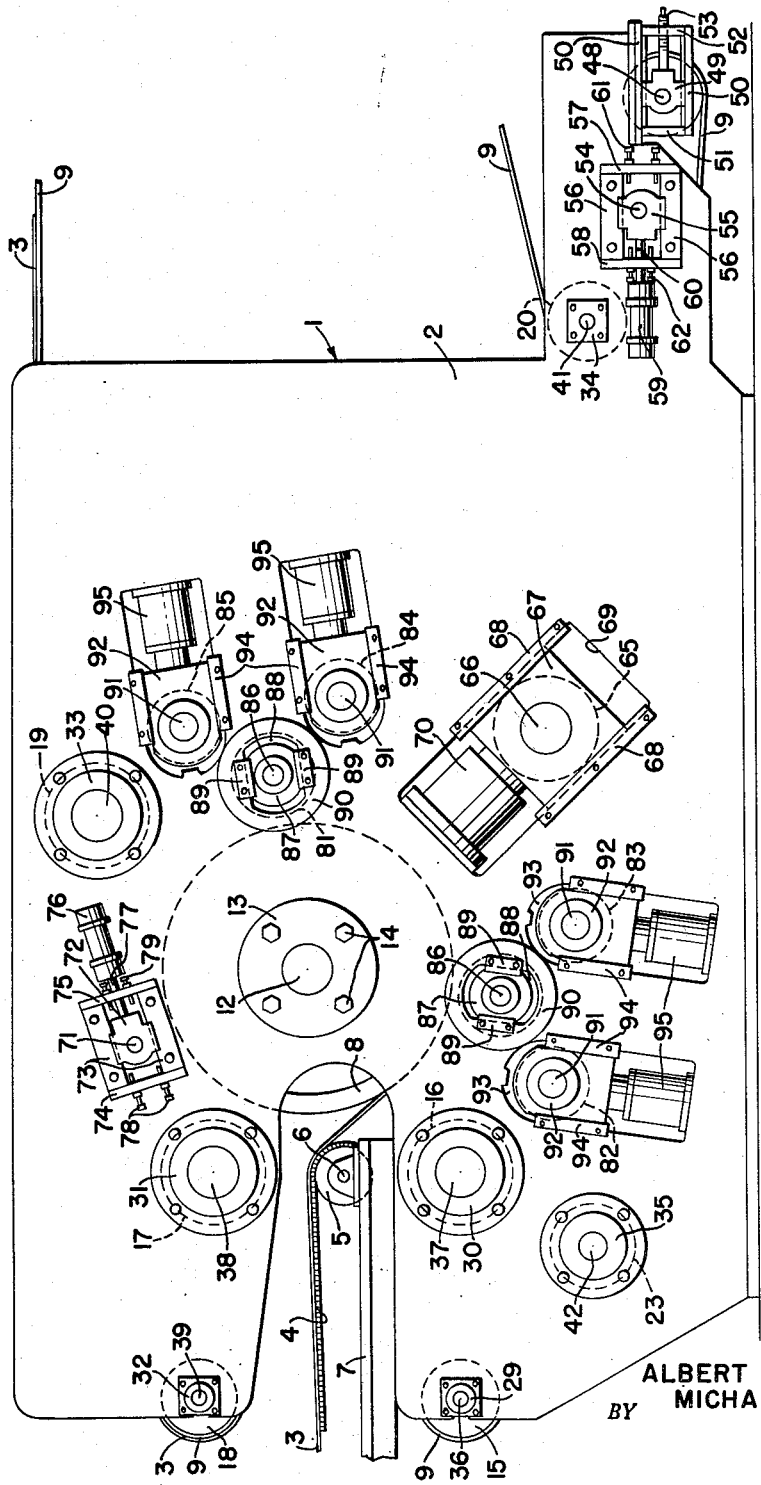

Dec. 22, 1953  A. GOULDING, JR., ET AL  2,663,052
CONTINUOUS TREATING APPARATUS

Filed Sept. 27, 1951  2 Sheets-Sheet 1

INVENTOR.
ALBERT GOULDING, JR.
MICHAEL JUKICH
BY
R. L. Miller
ATTORNEY

Dec. 22, 1953  A. GOULDING, JR., ET AL  2,663,052
CONTINUOUS TREATING APPARATUS
Filed Sept. 27, 1951  2 Sheets-Sheet 2

INVENTOR.
ALBERT GOULDING, JR.
BY  MICHAEL JUKICH
R.L. Miller
ATTORNEY

Patented Dec. 22, 1953

2,663,052

UNITED STATES PATENT OFFICE 2,663,052

CONTINUOUS TREATING APPARATUS

Albert Goulding, Jr., Cuyahoga Falls, and Michael Jukich, Akron, Ohio, assignors to Wingfoot Corporation, Akron, Ohio, a corporation of Delaware Application September 27, 1951, Serial No. 248,518

5 Claims. (Cl. 18—6)

1

The present invention relates to an improved form of continuous treating apparatus of the type embodying a drum and an endless band encompassing a major portion of the drum employed in treating or finishing plastic and rubber material of indeterminate lengths. More particularly, the invention pertains to means for adjustably controlling and maintaining the uniformity of the pressure exerted by the endless band against the drum.

Such continuous treating apparatus as that with which the present invention is especially well adapted to be employed has been used rather extensively for many years in the vulcanization of rubber mats, conveyor belts, printers' blankets, and other similar products. More recently, continuous treating apparatus of this type has been successfully employed in the treatment of various forms of plastics. Such plastic operations include curing, finishing, laminating, and other similar treatments requiring sustained heat and pressure applied to the material.

By way of illustration only, the present invention will be described in detail as it is applied to continuous treating apparatus such as that used in the manufacture of vinyl flooring from a plurality of superposed plies of vinyl material of relatively thin gauge. In the production of such material with conventional continuous treating apparatus embodying a heated drum and an endless band encompassing a major portion of the drum, it is difficult to achieve and to maintain sufficient compression on the material as it passes around the drum to bond the several superposed plies inseparably together and to produce the desired finish on the exposed surfaces thereof. Thus, the present invention contemplates means for the application of additional controllable pressure on the traveling material beyond that customarily achieved solely by the endless band.

It is an object of the present invention to provide a novel means for applying uniform and readily controllable pressure of the material being treated.

It is a further object of the present invention to provide pressure applying means which will achieve the desired result without introducing deflection in the member through which the pressure is applied.

To this end the preferred embodiment of the invention employs an endless pressure element encompassing the endless band. The pressure element is capable of being adjusted into close contact under controlled uniform pressure with the endless band. Moreover, one or more members are disposed transversely of the endless band in contact with that portion of the endless pressure element which encompasses the endless band and the drum, and means are provided which cooperate with the remaining portion of the endless pressure element to urge the member or members against the encompassing portion thereof.

Thus the pressure element applies a positive and uniform pressure against the endless band. At the same time, however, the pressure element is caused through the medium of a suitable adjustable means to exert pressure against one or more members which in turn produce additional pressure zones indirectly upon the endless band.

Other objects and advantages of the present invention will become apparent from the following description of the apparatus illustrated in the accompanying drawings.

Figure 2:
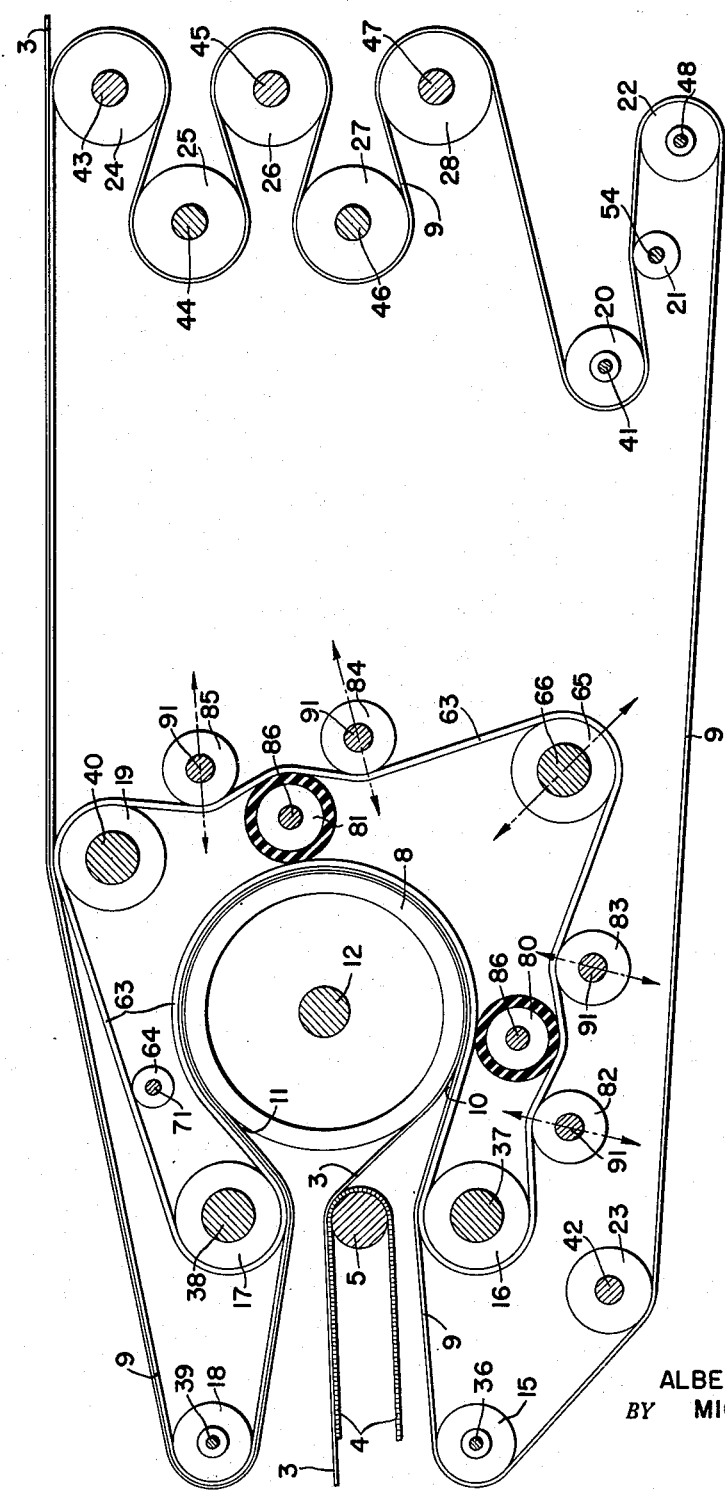

In the drawings, Fig. 1 is a side view of one form of continuous treating apparatus, in this case a finishing machine employed in the manufacture of laminated vinyl plastic flooring material and other similar products and embodying the teachings of the present invention. Fig. 2 is essentially a diagrammatic representation of the machine of Fig. 1 in the form of a vertical section taken adjacent the point of suspension of the several rolls with parts omitted and in elevation.

In Fig. 1, the reference numeral 1 identifies a continuous treating apparatus or finishing machine which illustrates a preferred embodiment of the present invention. The finishing machine 1 is composed of a pair of vertically disposed frames 2 which provide mountings for the several fixed and adjustable bearings for the drum and the several guide rolls in a manner to be described hereinafter. The finishing machine 1 is adapted to receive the stock 3 which in this case is a multiple ply vinyl laminate transported by an endless conveyor belt 4 passing over a supporting roll 5 freely rotatably mounted in bearings 6 on the supporting structure 7.

The stock 3 is passed between the surface of the drum 8 and the endless band 9 which, as will be seen from Fig. 2 of the drawings, encompasses a major portion of the periphery of the drum. The drum 8 is adapted to be internally heated by any one of several different types of conventional heating devices employing steam, hot water, or electrical energy. The stock 3 enters between the drum 8 and the endless band 9 at the point identified by the reference numeral 10 and is separated from the surface of the drum at the point 11. The stock 3 is thereafter supported by the endless band 9 until it is withdrawn subsequently in the process for additional treatment such, for example, as cooling, inspection, and final packaging.

The drum 8 is supported by a horizontally disposed shaft 12 which is rotatably mounted in bearings 13 secured to each of the spaced frames 2 as by means of a plurality of bolts 14. It should be noted at this juncture that the bearing mountings and accessories employed on the single frame 2 of the continuous treating apparatus 1, as illustrated in Fig. 1 of the drawings, is essentially duplicated with respect to a similar frame disposed in spaced relation to the one illustrated in order that both ends of the shaft 12 for the drum 8 as well as the other rolls hereinafter to be described are satisfactorily supported. As is customary in conventional continuous treating apparatus of the type to which the present invention applies, means (not shown) are provided for actuating the drum 8, thereby driving the endless band 9 which is in frictional contact with the periphery thereof.

The endless band 9 is supported by a number of freely rotatably mounted rolls 15, 16, 17, 18, 19, 20, 21, 22, and 23. In the course of its passage over the several rolls previously enumerated, it is directed around the several cooling drums 24, 25, 26, 27, and 28. The several bearing mountings 29, 30, 31, 32, 33, 34, and 35 secured to the frame 2 of the continuous treating apparatus 1 serve to support the several shafts 36, 37, 38, 39, 40, 41, and 42 for the fixed rolls 15, 16, 17, 18, 19, 20, and 23, respectively. Similarly, the several shafts 43, 44, 45, 46, and 47 serve to support the cooling drums 24, 25, 26, 27, and 28, respectively, in a suitable frame structure (not shown) in the arrangement indicated in Fig. 2.

The shaft 48 which supports the roll 22 employed in supporting the endless band 9 is mounted at each end thereof in a bearing block 49 which is freely slidably positioned between the spaced parallel guides 50 secured to the frame 2 of the continuous treating apparatus 1. The spacing between the guides 50 is maintained by a pair of spacers 51 and 52. The spacer 52 is provided with a tapped hole extending therethrough to receive a screw 53. The screw 53 is rotatably anchored in the bearing block 49. It will be understood that the adjustment of the bearing block 49 accomplished by the action of rotating the screw 53 will afford a certain degree of take-up in the endless band 9 and will provide for the introduction of tension in the band.

In order to insure that the endless band 9 will satisfactorily remain in the proper axial relation to the several supporting rolls over which it is directed, there is provided a means for shifting the band in a lateral dimension. This is accomplished by supporting the shaft 54 of the roll 21, which has a tapered periphery rather than the normal cylindrical surface found in the other supporting rolls, in a bearing block 55 at each end of the shaft. This arrangement will enable the shaft 54 and its roll 21 to be moved in a direction parallel to the travel of the endless band 9 and to exert or relax pressure against the edge of said band as it traverses its path. The operation of the device is initiated by any suitable conventional form of limit control (not shown) having a means for contacting the edge of the endless band 9.

The bearing block 55 is slidably mounted in the spaced parallel guides 56 secured to the frame 2 of the continuous treating apparatus 1. The parallel relationship of the guides 56 is maintained by the spacers 57 and 58. A pneumatic cylinder 59, actuated by the limit control referred to above, serves to actuate a shaft 60 secured to the bearing block 55. A pair of adjustable stops 61 and a similar pair of stops 62 are mounted in the spacers 57 and 58, respectively, to define the extremes of the shiftable movement of the bearing block 55 in counteracting for the transverse movement of the endless band 9.

As will be noted from the showing of the apparatus in Fig. 2 of the drawings, an endless pressure element 63 is so positioned that it hugs and substantially completely encompasses the portion of the endless band 9 which encircles the drum 8. The pressure element 63 is supported by the fixed rolls 16, 17, and 19 previously described in connection with the endless band 9 as well as a tapered roll 64 similar to the roll 21 and an adjustable roll 65.

The adjustable roll 65 is supported by a horizontally disposed shaft 66 which is mounted at each end in a suitable bearing block 67. The bearing block 67 is adapted to be be held in place by the guides 68 secured to the frame adjacent the margins of the aperture 69 in which the bearing block is mounted. The adjustable movement of the shaft 66 is accomplished by a hydraulic cylinder 70 which can be closely regulated to provide the desired tension in the endless pressure element 63 by moving the bearing block 67 in the direction indicated by the arrows in Fig. 2.

The tapered roll 64 is adjustably mounted in the same fashion as the tapered roll 21. This feature serves to insure that if the pressure element 63 should move in a lateral direction or parallel to the axes of its supporting rolls, it will be realigned in the same manner as the endless band is shifted. The shaft 71 of the tapered roll 64 is mounted at each end in a bearing block 72 slidably positioned between the parallel guides 73 secured to the face of the frame 2.

A pair of spacers 74 and 75 are disposed at the opposite ends of the guides 73. The pneumatic cylinder 76, through its shaft 77 connected to the bearing block 72, serves to provide the desired shiftable movement of the shaft 71 as the endless pressure element shifts laterally in its position with respect to the supporting rolls. A pair of adjustable stops 78 and a similar adjustable stop 79 are provided with spacers 74 and 75, respectively, to limit the extremities of movement of the bearing block 72 in the guides 73. The pneumatic cylinder 76 is operated by a suitable limit control (not shown) which is so disposed that it will be actuated by the edge of the pressure element.

Within the path of travel of the endless pressure element 63, one or more members, such, for example, as the rubber covered rolls 80 and 81, may be provided. These rolls 80 and 81 serve to establish zones of increased pressure through which the stock 3 is passed in its path of travel from the point 10 to the point 11 on the drum 8. Inasmuch as the supporting structure for the rolls 80 and 81 and the manner of adjusting the pressure applied by the rolls are achieved by substantially identical means, it will be sufficient to describe only one of these elements in order to afford a complete understanding of the apparatus and its operation.

The pressure which is exerted by the members or rubber covered rolls 80 and 81 in the apparatus is achieved in each case by a pair of adjustable rolls 82 and 83, 84 and 85, respectively. As in the case of the mounting of the rubber covered rolls 80 and 81, the adjusting features of the several adjustable rolls 82 and 83, 84 and 85 are exactly alike. The dotted arrows in the axes of the shafts 91 for the several adjustable rolls 82, 83, 84, and 85 (Fig. 2) shows the direction in which the adjustment takes place.

The roll 80 is supported by a horizontally disposed shaft 86 which is in turn supported at each end by a bearing block 87 mounted for shiftable movement in an aperture 88 in the frame 2 between the guides 89 secured to the face of a circular plate 90 defining the outline of the aperture. In this manner the roll 80, and similarly roll 81, will be enabled to exert pressure against the surface of the drum 8 indirectly through the endless pressure element 63 and the endless band 9 in a direction generally normal to the axis of the shaft 12 supporting the drum.

The slidable adjustment of the shaft 86 and its roll 80 is achieved by means of the rolls 82 and 83 while the similar action with respect to the roll 81 is achieved by the adjustment of the adjustable rolls 84 and 85. The rolls 82 and 83 are each supported by a horizontally disposed shaft 91, each end of which is disposed in a bearing block 92. The bearing block 92 in each instance is slidably supported in the aperture 93 in the frame 2 and held in place therein by the spaced parallel guides 94. The actuation of the bearing blocks 92 in shifting the shafts 91 and their rolls 82 and 83 is accomplished by the adjustment of the hydraulic cylinder 95.

Thus, the pressure exerted upon the drum 8 by the encompassing portion of the pressure element 63 (that part of the element encircling the drum and in contact with the endless band 9) by virtue of the adjustment provided by the roll 65, will be readily controllable and uniform. The remaining portion of the endless pressure element 63 (that part not encircling the drum 8) through the adjustment of the adjustable rolls 82, 83, 84, and 85, exerts a uniform pressure against the members 80, 81. Inasmuch as the width of the endless pressure element 63 is substantially coextensive with the axial dimension of the rolls 80 and 81, there can be no deflection in the rolls and uniformity of pressure against the drum 8 is insured.

While certain representative embodiments and details have been shown for the purpose of illustrating the invention, it will be apparent to those skilled in this art that various changes and modifications may be made therein without departing from the spirit or scope of the invention.

We claim:

1. In continuous apparatus for the treatment of plastic and rubber material of indeterminate length embodying a drum and an endless band encompassing a major portion of the periphery of the drum and subjecting said material to uniform pressure as it is passed between the drum and the band, means for adjustably controlling the pressure exerted upon the material by the band comprising an endless pressure element; means supporting and guiding the pressure element in such fashion that a portion thereof is disposed in contact with that part of the endless band which encompasses the drum; at least one member disposed transversely of the endless band for contact with the above-mentioned portion of the pressure element; and means urging a portion of the pressure element against the member.

2. In continuous apparatus for the treatment of plastic and rubber material of indeterminate length embodying a drum and an endless band encompassing a major portion of the periphery of the drum and subjecting said material to uniform pressure as it is passed between the drum and the band, means for adjustably controlling the pressure exerted upon the material by the band comprising an endless pressure element; means supporting and guiding the pressure element in such fashion that a portion thereof substantially completely encircles and is disposed in contact with that part of the endless band which encompasses the drum; a plurality of members disposed transversely of the endless band for contact with the above-mentioned portion of the pressure element; and means urging a portion of the pressure element against each of the members.

3. In continuous apparatus for the treatment of plastic and rubber material of indeterminate length embodying a drum and an endless band encompassing a major portion of the periphery of the drum and subjecting said material to uniform pressure as it is passed between the drum and the band, means for adjustably controlling the pressure exerted upon the material by the band comprising an endless pressure element; a plurality of freely rotatably mounted rolls supporting and guiding in a path such that at least a portion of the pressure element is in contact with the endless band, one of said rolls being movable to vary the tension applied to the pressure element; a plurality of rotatable members disposed transversely of the endless band and arranged in spaced mutually parallel relation with respect to the axis of the drum for contact with the aforementioned portion of the pressure element; and means disposed in straddling relation to each rotatable member for urging a portion of the pressure element thereagainst.

4. In continuous apparatus for the treatment of plastic and rubber material of indeterminate length embodying a drum and an endless band encompassing a major portion of the periphery of the drum and subjecting said material to uniform pressure as it is passed between the drum and the band, means for adjustably controlling the pressure exerted upon the material by the band comprising an endless pressure element; a plurality of freely rotatably mounted rolls supporting and guiding in a path such that at least a portion of the pressure element is in contact with the endless band, one of said rolls being movable to vary the tension applied to the pressure element; a plurality of rotatable members disposed transversely of the endless band and arranged in spaced mutually parallel relation with respect to the axis of the drum for contact with the aforementioned portion of the pressure element; a pair of rotatably mounted adjustable rolls disposed in contact with a remaining portion of the pressure element in straddling relation to each rotatable member; and means mounting each adjustable roll for exerting a predetermined pressure against the rotatable member.

5. In continuous apparatus for the treatment of plastic and rubber material of indeterminate length embodying a drum and an endless band encompassing a major portion of the periphery of the drum and subjecting said material to uniform pressure as it is passed between the drum and the band, means for adjustably controlling the pressure exerted upon the material by the band comprising an endless pressure element; a plurality of freely rotatably mounted rolls supporting and guiding the pressure element in such fashion that it substantially completely encircles the drum with a portion of said pressure element being arranged to contact that part of the endless band which encompasses the drum while the remaining portion of the pressure element is spaced outwardly from the contacting portion thereof, one of said rolls being mounted for shiftable movement to introduce a predetermined tension in the pressure element; a pair of members disposed between the spaced contacting and remaining portions of the pressure element, the axial dimension of each of said members being substantially coextensive with that of the drum; a mounting for each member which affords shiftable movement of the member in a direction generally normal to the spaced portions of the pressure member; a pair of adjustable rolls mounted in contact with the remaining portion of the pressure element and astride each member; a slidable mounting for each adjustable roll; and a pressure responsive device in each mounting for urging the adjustable rolls against the pressure element and the member.

ALBERT GOULDING, Jr.
MICHAEL JUKICH.

References Cited in the file of this patent
UNITED STATES PATENTS

| Number | Name | Date |
|---|---|---|
| 1,060,122 | Prosing | Apr. 29, 1913 |
| 2,143,627 | Knowland | Jan. 10, 1939 |
| 2,182,168 | Bierer | Dec. 5, 1939 |